United States Patent [19]
Williams

[11] 3,782,751
[45] Jan. 1, 1974

[54] OVAL SHAPED WHEELS

[76] Inventor: Victor E. Williams, 3662 77th Pl., Merrillville, Ind. 46410

[22] Filed: Aug. 21, 1972

[21] Appl. No.: 282,364

[52] U.S. Cl. ............... 280/87.01, 280/229, 280/220, 301/121
[51] Int. Cl. ............................................. B62b 11/00
[58] Field of Search ................. 280/87.01, 229, 220; 301/119, 121

[56] References Cited
UNITED STATES PATENTS

| | | | |
|---|---|---|---|
| 499,009 | 6/1893 | Bunker | 280/229 |
| 1,561,918 | 11/1925 | Feddersen | 280/229 |
| 1,766,375 | 6/1930 | Crain | 301/119 X |
| 1,784,330 | 12/1930 | Bowers | 301/121 |
| 3,152,813 | 10/1964 | Brown | 280/87.01 UX |

*Primary Examiner*—Leo Friaglia
*Assistant Examiner*—Randall A. Schrecengost

[57] ABSTRACT

Oval shaped wheels on a vehicle, so that if the vehicle is a wagon or other multi-shaped vehicle, the wheels can be misaligned in rise and fall, either between front and rear wheels or between opposite side wheels so that the vehicle in the former case will pitch as it travels while in the former the vehicle will roll, and wherein if the rise and fall of all wheels are aligned the vehicle body will rise and lower in a constant horizontal plane.

2 Claims, 5 Drawing Figures

PATENTED JAN 1 1974  3,782,751
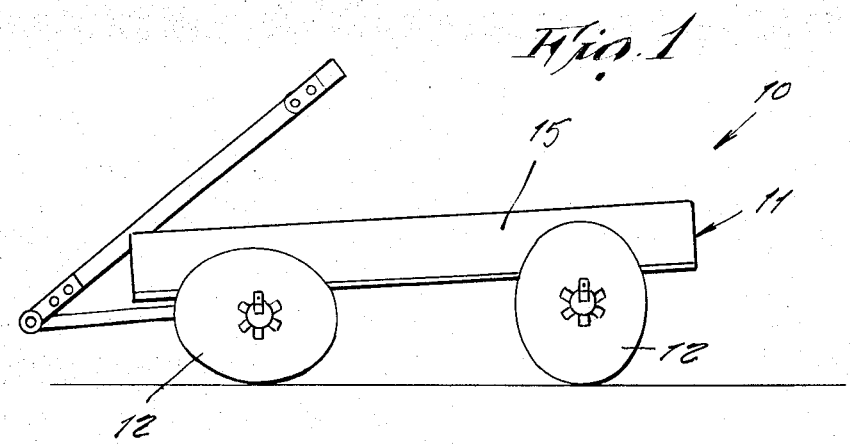
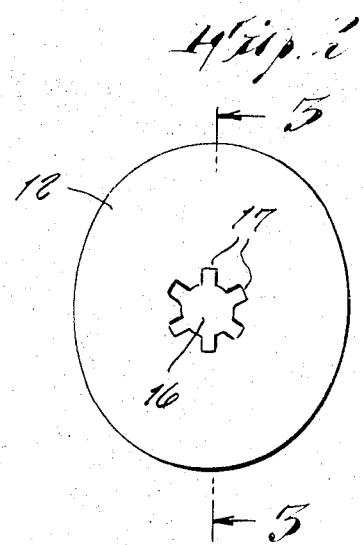
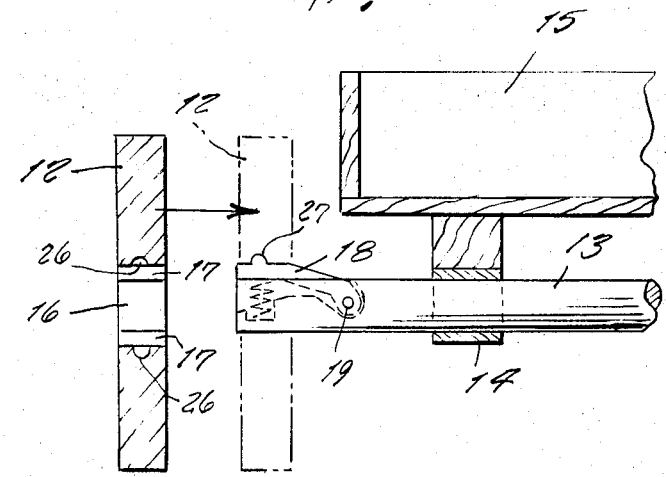
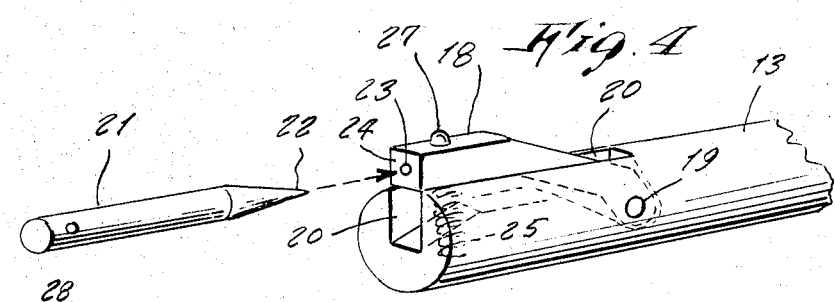
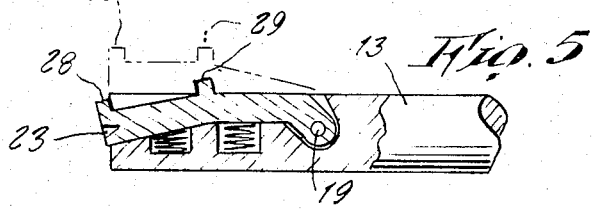
INVENTOR
VICTOR E. WILLIAMS

OVAL SHAPED WHEELS

This invention relates generally to amusement rides.

A principal object of the present invention is to provide a vehicle of any type and which travels either on one or more wheels which are of oval shape so to produce a fun ride.

Another object is to provide a vehicle wherein accordingly if multi-wheeled with oval wheels the vehicle may be made to selectively either pitch, roll or the vehicle bed will rise and lower in a constant horizontal plane as the vehicle travels.

Another object is to provide an oval shaped wheeled vehicle which can be either a toy much as a pull toy, or an actual riding vehicle for a child such as a wagon, cart, stroller, buggy, or which can be a riding vehicle in an amusement park for amusement and entertainment of adults as well as children.

Yet another object is to provide an oval shaped wheeled vehicle wherein the wheels can be adjustably repositioned so that the rise and fall of the wheels can be variously misaligned or aligned to give different riding actions.

Other objects are to provide an oval wheeled vehicle which is simple in design, inexpensive to manufacture, rugged in construction, easy to use and efficient in operation.

These and other objects will be readily evident upon a study of the following specification and the accompanying drawing wherein:

FIG. 1 is a side elevation view of a multi-wheeled vehicle incorporating the present invention.

FIG. 2 is a side view of one of the wheels shown per se.

FIG. 3 is a cross sectional view taken on line 3—3 of FIG. 2 and illustrating the wheel mounting on the vehicle axle.

FIG. 4 is a perspective view of the means of adjusting the wheel mounting.

FIG. 5 is a longitudinal cross sectional view of a slightly modified design thereof.

Referring now to the drawing in detail, and more particularly to FIGS. 1 through 4 at this time, the reference numeral 10 represents an oval wheeled vehicle according to the present invention wherein there is a multi-wheeled vehicle 11 provided with a plurality of oval shaped wheels 12 which may either be eccentrically or centrally mounted on a shaft 13 that is supported rotatably free in a bearing 14 secured stationarily to the body 15.

Each wheel 12 has a central or eccentrically positioned opening 16 the peripheral edge of which has a series of spaced apart keyways 17 for selectively being engaged by a key 18 secured pivotally to the shaft 13 by means of a transverse pin 19; the key being adaptable to be pivoted into a keyway 20 in the shaft 13 by means of a tool 21 having a tapered point 22 at one end thereof receivable into a depression 23 in the end 24 of the key. A compression coil spring 25 normally urges the key 18 pivotally outwardly of key way 20 and into one of the keyways 17 of the wheel 12 so to transmit rotational power between the wheel and axle. Each of the keyways 17 of the wheel 12 has a depression 26 into which a projection 27 on the key 18 is receivable and which serves to prevent the wheel from accidently sliding off the axel.

In operative use it is now evident that the wheels can be aligned or disaligned for use and fall by resetting the key in one of the keyways 17, this being accomplished by first pushing the key 18 into the keyway 20 so to allow the wheel 12 to rotate to the new setting after which the key is released so that the spring 25 holds the key in the selected keyway.

In FIG. 5 a similar structure is shown except that instead of the depressions 26 in the wheel 12 and the projection 27 on the key 17, there are a pair of spaced apart lugs 28 and 29 on the key 18 between which a wheel is retained so to prevent sliding off the axel. Instead of one spring 25, two are shown.

Thus there is provided an oval wheeled vehicle for diversion and enjoyment.

While various changes may be made in the detail construction, it is to be understood that such changes will be within the spirit and scope of the present invention.

I claim:

1. In an oval wheeled vehicle the combination of a vehicle body supported on a plurality of oval shaped wheels, wherein said vehicle having said plurality of wheels is adjustable so that said oval wheels can be disaligned in use and fall between wheels at a front and rear of said vehicle to cause pitching, or between wheels at right and left side to cause rolling, or wherein said wheels can be aligned so that said body rises and lowers in a horizontal plane during travel, wherein each said wheel has an opening for receiving an axle said opening having a series of keyways all around, and said axle has a key pivotable at one end about a transverse pin, so to be pivotable inwardly and outwardly of a keyway in said axle and selectively into one of said keyways in said wheel, said key being normally urged by a spring to engage said keyway of said wheel.

2. The combination as set forth in claim 1 wherein a depression in an end wall of said key is adaptable to receive any pointed implement to urge said key against the section of said spring for retracting said key into said axle keyway momentarily to disengage with said keyway of said wheel so to permit resetting said wheel on said axle.

* * * * *